United States Patent
Suzuki

(10) Patent No.: US 9,566,940 B2
(45) Date of Patent: Feb. 14, 2017

(54) EXTERNAL AIRBAG

(71) Applicant: Fuji Jukogyo Kabushiki Kaisha, Tokyo (JP)

(72) Inventor: Mototsugu Suzuki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/064,457

(22) Filed: Mar. 8, 2016

(65) Prior Publication Data

US 2016/0288764 A1 Oct. 6, 2016

(30) Foreign Application Priority Data

Mar. 31, 2015 (JP) ................................. 2015-070773

(51) Int. Cl.
| B60R 21/36 | (2011.01) |
| B60R 21/00 | (2006.01) |
| B60R 21/34 | (2011.01) |

(52) U.S. Cl.
CPC .......... B60R 21/36 (2013.01); *B60R 2021/003* (2013.01); *B60R 2021/0004* (2013.01); *B60R 2021/346* (2013.01)

(58) Field of Classification Search
CPC ............. B60R 21/36; B60R 2021/0004; B60R 2021/003; B60R 2021/346
See application file for complete search history.

(56) References Cited

U.S. PATENT DOCUMENTS

| 7,174,986 | B2* | 2/2007 | Takimoto | B60R 21/2338 180/274 |
| 9,132,799 | B1* | 9/2015 | Choi | B60R 21/36 |
| 2005/0206138 | A1* | 9/2005 | Breuninger | B60R 21/231 280/729 |
| 2005/0257979 | A1* | 11/2005 | Hamada | B60R 21/2338 180/274 |
| 2006/0151228 | A1* | 7/2006 | Kalliske | B60R 21/2338 180/274 |
| 2006/0157958 | A1 | 7/2006 | Heudorfer et al. | |
| 2009/0200778 | A1* | 8/2009 | Ishikawa | B60R 21/2338 280/739 |

(Continued)

FOREIGN PATENT DOCUMENTS

| EP | 2 502 794 A1 | 9/2012 |
| JP | 2005-153851 A | 6/2005 |

(Continued)

OTHER PUBLICATIONS

Japanese Office Action dated Jun. 7, 2016 with an English translation thereof.

*Primary Examiner* — Darlene P Condra
(74) *Attorney, Agent, or Firm* — McGinn IP Law Group, PLLC.

(57) ABSTRACT

An external airbag includes an airbag body and an urging portion. The airbag body is deployed to extend in front of a front pillar and upward along the front pillar from a lower end of the front pillar. The front pillar is disposed along a lateral edge of a windshield of an automobile. The urging portion urges downward a vicinity of a leading end of the airbag body deployed upward along the front pillar such that the leading end is moved back downward along the front pillar, and that forms a space between an intermediate portion of the airbag body and the front pillar.

9 Claims, 4 Drawing Sheets

(56) References Cited

U.S. PATENT DOCUMENTS

| | | | |
|---|---|---|---|
| 2010/0276915 A1 | 11/2010 | Breuninger et al. | |
| 2010/0276916 A1 | 11/2010 | Breuninger et al. | |
| 2013/0200603 A1* | 8/2013 | Bergenheim | B60R 21/36 280/762 |
| 2013/0333972 A1* | 12/2013 | Rydsmo | B60R 21/36 180/274 |
| 2014/0332305 A1* | 11/2014 | Thomas | B60R 21/36 180/274 |
| 2015/0090516 A1* | 4/2015 | Kitte | B60R 21/36 180/274 |
| 2015/0217719 A1* | 8/2015 | Vitet | B60R 21/36 180/274 |
| 2016/0059823 A1* | 3/2016 | Jayasuriya | B60R 21/38 180/274 |

FOREIGN PATENT DOCUMENTS

| | | | |
|---|---|---|---|
| JP | 2006-137413 A | | 6/2006 |
| JP | 2007-076542 A | | 3/2007 |
| JP | EP1992526 A1 | * | 11/2008 |
| JP | EP2050635 A1 | * | 4/2009 |
| JP | 2015186987 A | * | 10/2015 |

* cited by examiner

EXTERNAL AIRBAG

CROSS-REFERENCE TO RELATED APPLICATIONS

The present application claims priority from Japanese Patent Application No. 2015-070773 filed on Mar. 31, 2015, the entire contents of which are hereby incorporated by reference.

BACKGROUND

1. Technical Field

The present disclosure relates to an external airbag and particularly to an external airbag that is deployed so as to extend upward along a front pillar.

2. Related Art

In related art, external airbags have been used that protect a subject to be protected such as a pedestrian against the impact of a collision in case the subject to be protected collides with an automobile. In general, an external airbag is folded and housed in an automobile and is deployed by injection of deployment gas into the airbag. The deployed external airbag, when receiving a subject to be protected, is deformed depending on the pressure from the subject, and thus the collision energy of the subject is absorbable by the external airbag. External airbags are in practical use which are each deployed along, for instance, front pillars which are formed solidly in an automobile. Here, the front pillars are formed so as to extend along the sides of the windshield, and there are calls for an external airbag that is deployed so as to reliably cover the front pillars without being displaced from the front pillars.

Thus, as a technique for reliably covering the front pillars, for instance, Japanese Unexamined Patent Application Publication (JP-A) No. 2005-153851 proposes a protection device for pedestrians including a first airbag that inflates so as to cover the vicinity of the center of the cowl top, and a second airbag that inflates so as to cover the front pillars on both sides of the first airbag. The protection device for pedestrians is such that the first airbag first starts to inflate and the second airbag inflates upward along the front pillars while being in contact with the inflated first airbag, and thus the second airbag may be inflated along the front pillars by being guided by the first airbag.

SUMMARY OF THE INVENTION

However, it is difficult to sufficiently absorb the collision energy of a subject to be protected by the protection device for pedestrians proposed by JP-A No. 2005-153851.

It is desirable to provide an external airbag that reliably absorbs the collision energy of a subject to be protected.

An external airbag according to the present disclosure includes: an airbag body that is deployed to extend in front of a front pillar and upward along the front pillar from a lower end of the front pillar, the front pillar being disposed along a lateral edge of a windshield of an automobile; and an urging portion that urges downward a vicinity of the leading end of the airbag body deployed upward along the front pillar such that the leading end of is moved back downward along the front pillar, and that forms a space between an intermediate portion of the airbag body and the front pillar, and a leading end of the airbag body.

The urging portion may have a tether that couples between the vicinity of the leading end of the airbag body and a vicinity of a base end of the airbag body.

The urging portion may have, in the intermediate portion of the airbag body, highly stretchable fiber that partially has increased stretchability.

DETAILED DESCRIPTION

Figure 1:
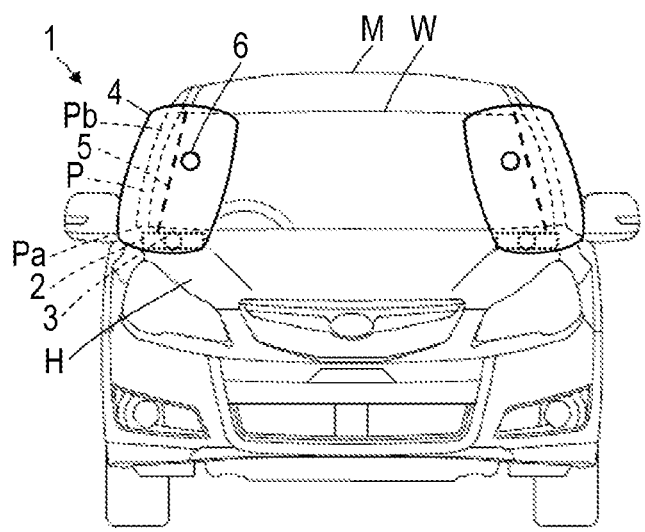
FIG. 1 is a view illustrating the configuration of an airbag device equipped with an external airbag according to an implementation of the present disclosure.

Hereinafter, an implementation of the present disclosure will be described with reference to the accompanying drawings. FIG. 1 illustrates the configuration of an airbag device equipped with an external airbag according to the implementation of the present disclosure. The airbag device has an external airbag 1 that is deployed outwardly of automobile M, a housing unit 2 that is disposed in the vicinity of the rear edge of front hood H of the automobile M and houses the external airbag 1, and an inflator 3 disposed in the housing unit 2. Here, in the automobile M, a pair of front pillars P is disposed along both lateral edges of windshield W, and the front hood H is disposed so as to project forward from a vicinity of the lower edge of the windshield W and to cover the front of the automobile M.

The external airbag 1 has a pair of airbag bodies 4 that is deployed forwardly of the pair of front pillars P, urging portions 5 that urge respective vicinities of the leading ends of the airbag bodies downward, and vent holes 6 disposed in respective vicinities of the centers of the airbag bodies 4. The airbag bodies 4 are deployed so as to extend from lower ends Pa to upper ends Pb of the pair of front pillars P, and the base end of each of the airbag bodies 4 is fixed to the housing unit 2. The airbag body 4, when being exposed from the housing unit 2, is deployed so as to extend upward along a corresponding front pillar P from the lower end Pa side of the front pillar P.

Each of the urging portions 5 is formed of an external tether that couples between the vicinities of the leading end and the base end of the airbag body 4. The urging portion 5 is provided so as to extend in up and down direction along the back of the airbag body 4 facing the front pillar P. The urging portion 5 urges the vicinity of the leading end of the airbag body 4 downward and raises up an intermediate point between the leading end and the base end of the airbag body 4, that is, an intermediate portion of the airbag body 4, so that the leading end of the airbag body, which has been upwardly deployed along the front pillar P, is moved back downward along the front pillar P. Each of the vent holes 6 is for reducing the internal pressure of the airbag body 4, and when the internal pressure reaches a predetermined pressure, the vent hole 6 is opened to release deployment gas in the airbag body 4 to the outside.

The housing unit 2 is disposed below the front hood H of the automobile M and houses the external airbag 1. The inflator 3 is coupled to the base end of the airbag body 4 to inject deployment gas to the inside of the airbag body 4. The injection of the deployment gas from the inflator 3 causes the airbag body 4 to be deployed to the outside of the vehicle through the space between the rear edge of the front hood H and the lower edge of the windshield W.

Figure 2:
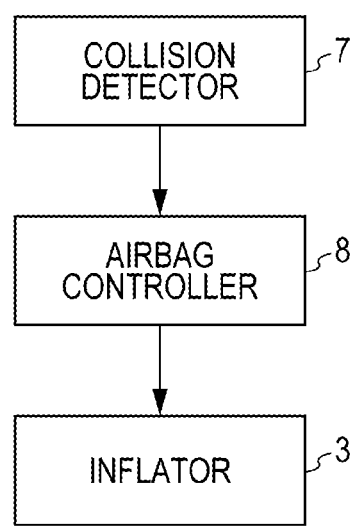
FIG. 2 is a block diagram illustrating a collision detector and an airbag controller.

In addition, as illustrated in FIG. 2, the automobile M is equipped with a collision detector 7 that detects collision of a subject to be protected, and the inflator 3 is coupled to the collision detector 7 via an airbag controller 8. The collision detector 7 detects a subject to be protected successively in front of the automobile M, and as the collision detector 7, it is possible to use, for instance, a detector that detects a subject to be protected by irradiating the subject with a laser, or a detector that detects a subject to be protected based on an image obtained from a camera. The airbag controller 8 determines whether or not a subject to be protected collides with the automobile M based on detection information obtained from the collision detector 7. When it is determined that the subject to be protected collides with the automobile M, the airbag controller 8 calculates a time taken for the subject to reach a front pillar P according to a collision point and causes the airbag body 4 to be deployed via the inflator 3 in the time.

Next, the operation of the implementation will be described. First, when a subject to be protected such as a pedestrian or a bicycle rider approaches the front of the automobile M, the collision detector 7 mounted in the automobile M detects the subject to be protected as illustrated in FIG. 2. Subsequently, based on the detection information detected by the collision detector 7, the airbag controller 8 determines the collision of the subject to be protected and calculates a time taken for the subject collided with and thrown by the automobile M to reach a front pillar P. The airbag controller 8 then injects deployment gas into the airbag body 4 from the inflator 3 according to the calculated reaching time.

Figure 3:
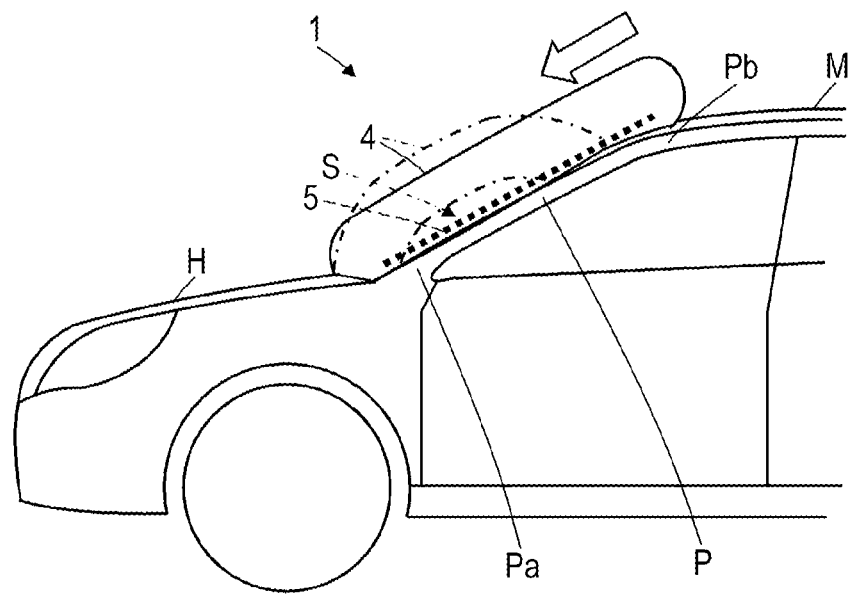
FIG. 3 is a view illustrating the manner in which the leading end of an airbag body is moved back by the urging of an urging portion.

Thus, the airbag body 4 is exposed to the outside of the vehicle through the space between the rear edge of the front hood H and the lower edge of the windshield W, and is deployed so as to extend upward along the front pillar P from the lower end Pa side of the front pillar P. At this point, the pressure of the deployment gas injected into the airbag body 4 from the inflator 3 is significantly high, and thus the momentum of the airbag body 4 extending upward exceeds the urging force of the urging portion 5, and the airbag body 4 is deployed so as to extend linearly along the front pillar P from the base end to the leading end as illustrated in FIG. 1. After the airbag body 4 extends linearly along the front pillar P, as illustrated in FIG. 3, the leading end of the airbag body 4 is moved back downward along the front pillar P by the urging of the urging portion 5. Along with the backward movement, an intermediate portion of the airbag body 4 is raised in a direction away from the front pillar P. This creates space S between the back of the airbag body 4 and the front pillar P. It is to be noted that when the airbag body 4 is deployed so as to extend linearly along the front pillar P from the base end to the leading end, deployment gas may be released through the vent hole 6 to reduce the internal pressure of the airbag body 4. This allows the leading end of the airbag body 4 to be moved back downward smoothly by the urging of the urging portion 5.

Figure 4:
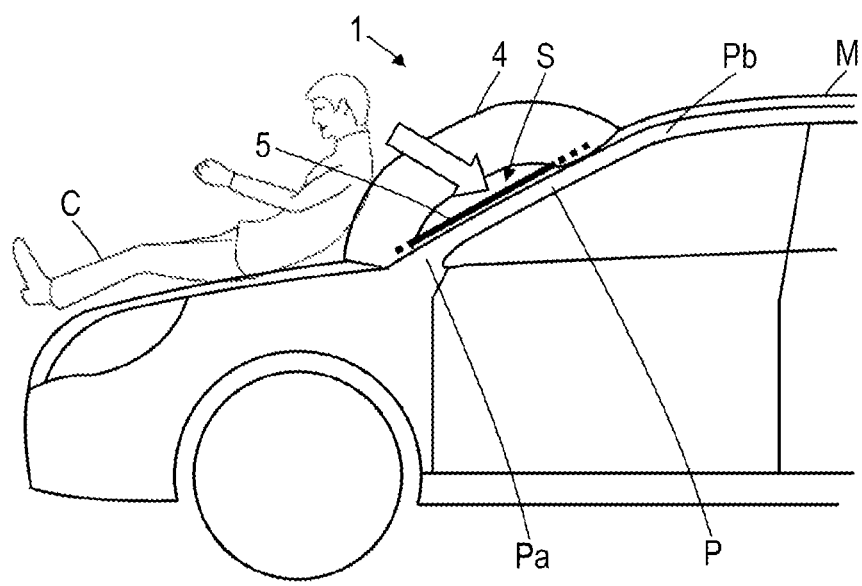
FIG. 4 is a view illustrating the manner in which a subject to be protected is received by the airbag body.

In this manner, subject to be protected C, which collides with the automobile M and is thrown toward the front pillar P, is received by the airbag body 4 deployed forwardly of the front pillar P as illustrated in FIG. 4. At this point, the intermediate portion of the airbag body 4, which receives the subject to be protected C, is deformed by the pressure from the subject C so as to eliminate the space S created between the front pillar P and the airbag body 4. When the space S is completely eliminated and the intermediate portion of the airbag body 4 comes into contact with the front pillar P, the airbag body 4 is pressed against the front pillar P to be deformed significantly. In this manner, since the collision energy of the subject to be protected C is absorbed stepwise in the stage where the airbag body 4 is deformed so as to eliminate the space S and in the stage where the airbag body 4 is pressed against the front pillar P to be deformed significantly, the collision energy may be reliably absorbed.

According to the present implementation, the urging portion 5 urges the leading end of the airbag body 4 downward, and thereby the leading end of the airbag body 4 deployed upward along the front pillar P is moved back downward along the front pillar P to form the space S between an intermediate portion of the airbag body 4 and the front pillar P. Consequently, when a subject to be protected C is received, the airbag body 4 is deformed stepwise and the collision energy of the subject C may be reliably absorbed.

Figure 5:
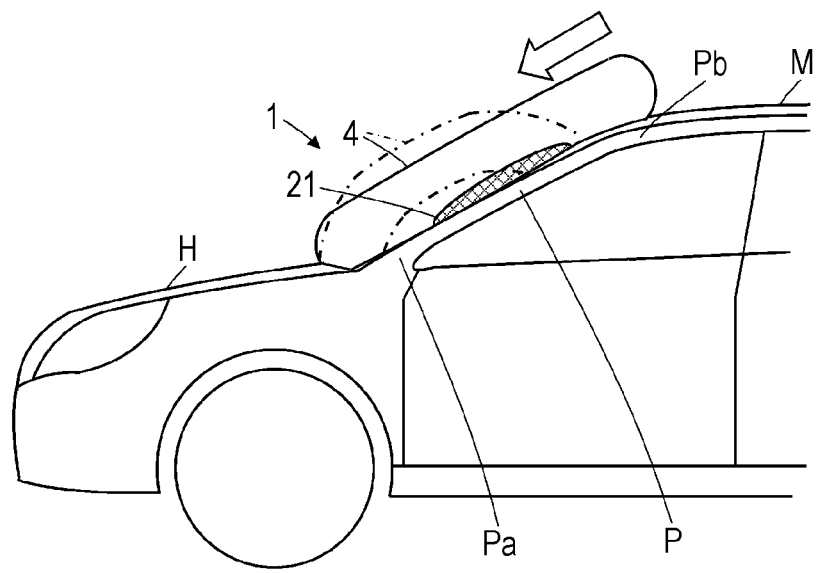
FIG. 5 is a view illustrating an urging portion composed of highly stretchable fiber.

It is to be noted that although the urging portion 5 is formed of an external tether that couples between the vicinities of the leading end and the base end of the airbag body 4 in the above-described implementation, it is sufficient that the vicinity of the leading end of the airbag body 4 be urged downward, so that the leading end of the airbag body 4 deployed upward along the front pillar P is moved back downward along the front pillar P, and it is not limited that the urging portion 5 is formed of an external tether. For instance, as illustrated in FIG. 5, instead of the urging portion 5, an urging portion 21 may be disposed rearwardly of the intermediate portion of the airbag body 4. The urging portion 21 is composed of highly stretchable fiber by which stretchability of fiber is partially increased in the intermediate portion of the airbag body 4.

Figure 6:
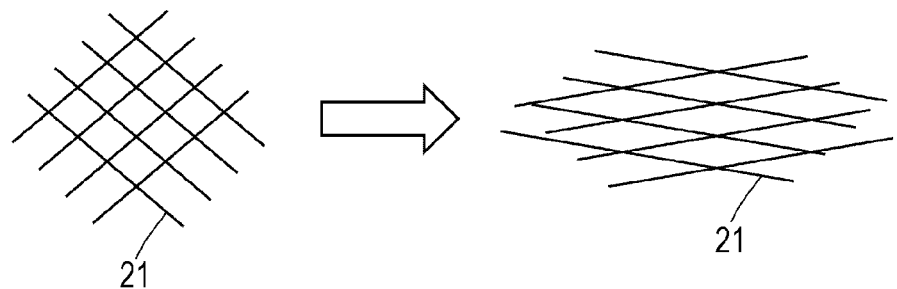
FIG. 6 is a view illustrating the manner in which the highly stretchable fiber is deformed.

When deployment gas is injected into such an airbag body 4, the airbag body 4 is deployed upward along the front pillar P while extending the urging portion 21 because the injection pressure of the deployment gas is extremely high. After the airbag body 4 extends linearly along the front pillar P, the leading end of the airbag body 4 is moved back downward along the front pillar P by the urging of the urging portion 21 and along with the backward movement, an intermediate portion of the airbag body 4 may be raised in a direction away from the front pillar P. Here, as the urging portion 21, for instance, an urging portion may be used that has rhombus meshes which are deformed so as to extend in the deployment direction of the airbag body 4 as illustrated in FIG. 6.

In this manner, an intermediate portion of the airbag body 4 is raised by the urging of the urging portion 21 in a direction away from the front pillar P to form the space S, and thus when a subject to be protected C is received, the airbag body 4 is deformed stepwise and the collision energy of the subject C may be reliably absorbed.

Figure 7:
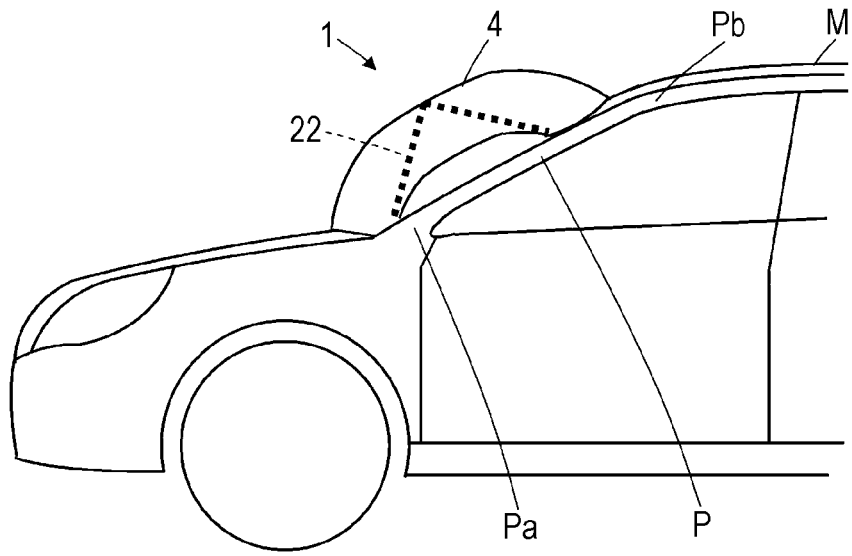
FIG. 7 is a view illustrating the airbag body provided with the urging portion formed of an internal tether.

Also, as illustrated in FIG. 7, instead of the urging portion 5, an urging portion 22 formed of an internal tether may be provided. The urging portion 22 is formed of an internal tether that internally couples between the vicinities of the intermediate portion and the leading end of the airbag body 4 as well as the vicinities of the intermediate portion and the base end of the airbag body 4. The urging portion 22 urges the vicinity of the leading end of the airbag body 4 downward, and thereby the leading end of the airbag body 4 deployed upward along the front pillar P may be moved back downward along the front pillar P.

Figure 8:
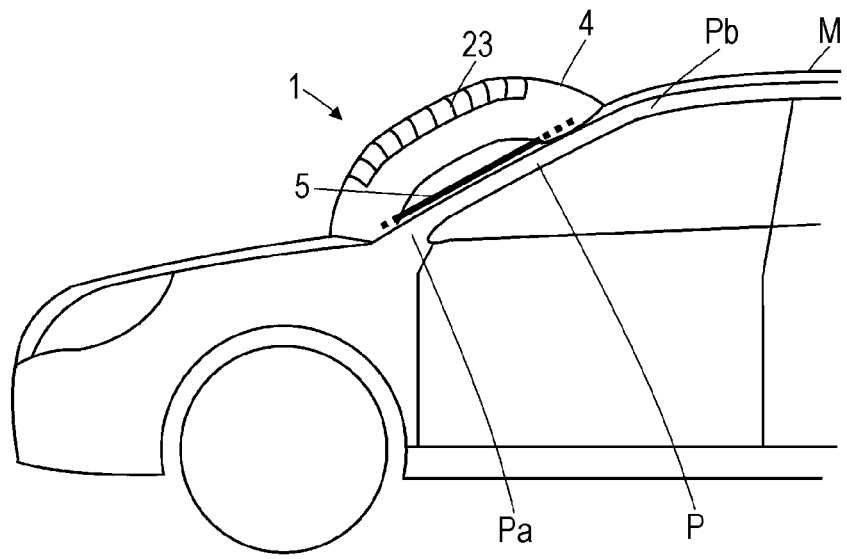
FIG. 8 is a view illustrating the airbag body provided with an expansion portion having a bellows structure.
Figure 9:
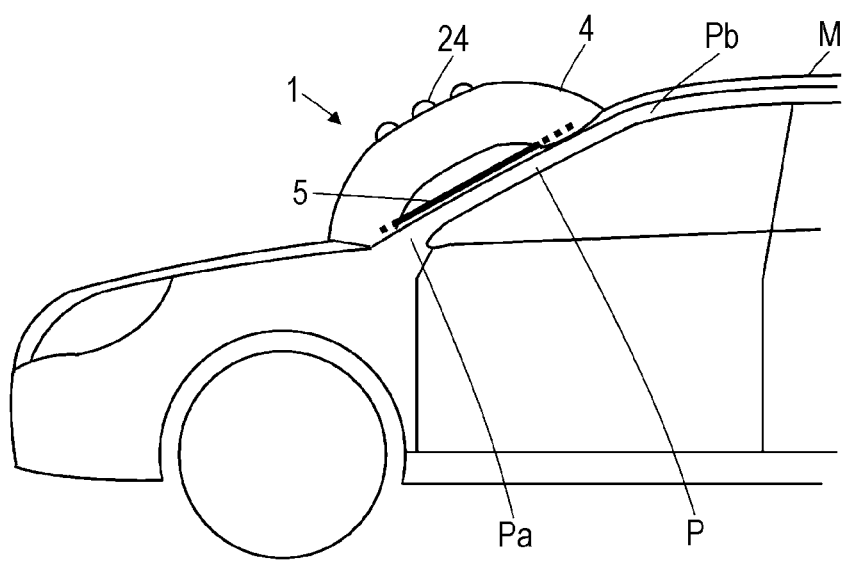
FIG. 9 is a view illustrating the airbag body provided with an expansion portion that causes slack.

Also, it is preferable in the above-described implementation that an extension portion be included for increasing the length of the intermediate portion of the airbag body 4 longer on the front side than on the back side, so that the intermediate portion of the airbag body 4 is reliably raised in a direction away from the front pillar P when the leading end of the deployed airbag body 4 is moved back downward along the front pillar P. For instance, as illustrated in FIG. 8, an extension portion 23 in a bellows structure may be provided on the front side of the intermediate portion of the airbag body 4. As illustrated in FIG. 9, an extension portion 24, which causes slack, may be provided on the front side of the intermediate portion of the airbag body 4. In this manner, the length of the intermediate portion of the airbag body 4 is made longer on the front side than on the back side, thereby allowing the airbag body 4 to be easily deformed so that the intermediate portion of the airbag body 4 is separated from the front pillar P.

The invention claimed is:

1. An external airbag comprising:
    an airbag body that is deployed to extend in front of a front pillar and upward along the front pillar from a lower end of the front pillar, the front pillar being disposed along a lateral edge of a windshield of an automobile; and
    an urging portion that urges downward a vicinity of a leading end of the airbag body deployed upward along the front pillar such that the leading end is moved back downward along the front pillar, and that forms a space between an intermediate portion of the airbag body and the front pillar,
    wherein the urging portion has a tether that couples between the vicinity of the leading end of the airbag body and a vicinity of a base end of the airbag body, the leading end and the base end being on opposite ends of the airbag respective to the intermediate portion.

2. The external airbag according to claim 1, wherein the airbag body is deployed to extend in front of the front pillar and upward along the front pillar from the lower end of the front pillar to an upper end of the front pillar.

3. The external airbag according to claim 1, wherein the airbag body is deployed to extend in front of the front pillar and upward along the front pillar from the lower end of the front pillar to an upper end of the front pillar such that an entirety of the front pillar is covered by the airbag body when deployed.

4. The external airbag according to claim 1, wherein at least one vent hole is formed in the airbag body for reducing an internal pressure of the airbag body.

5. The external airbag according to claim 1, wherein at least one vent hole is formed in the airbag body for reducing an internal pressure of the airbag body,
    wherein, when the internal pressure reaches a predetermined pressure, the at least one vent hole is opened to release deployment gas in the airbag body.

6. The external airbag according to claim 1, wherein the airbag body is exposed to an outside of the automobile through a space between a rear edge of a front hood and a lower edge of a windshield.

7. The external airbag according to claim 1, wherein the intermediate portion separates the airbag body from the front pillar to increase an impact absorption amount of the airbag.

8. The external airbag according to claim 1, wherein the tether is external to the airbag body and stretches from the leading end to the base end through the intermediate portion.

9. An external airbag comprising:
    an airbag body that is deployed to extend in front of a front pillar and upward along the front pillar from a lower end of the front pillar, the front pillar being disposed along a lateral edge of a windshield of an automobile; and
    an urging portion that urges downward a vicinity of a leading end of the airbag body deployed upward along the front pillar such that the leading end is moved back downward along the front pillar, and that forms a space between an intermediate portion of the airbag body and the front pillar,
    wherein the urging portion has, in the intermediate portion of the airbag body, stretchable fiber that partially has increased stretchability.

* * * * *